United States Patent
Stegner, Jr. et al.

(10) Patent No.: US 10,455,822 B2
(45) Date of Patent: Oct. 29, 2019

(54) FISHING ROD HOLDER

(71) Applicants: Richard D. Stegner, Jr., Jacksonville, FL (US); Ronda Stegner, Jacksonville, FL (US)

(72) Inventors: Richard D. Stegner, Jr., Jacksonville, FL (US); Ronda Stegner, Jacksonville, FL (US)

( * ) Notice: Subject to any disclaimer, the term of this patent is extended or adjusted under 35 U.S.C. 154(b) by 181 days.

(21) Appl. No.: 15/484,321

(22) Filed: Apr. 11, 2017

(65) Prior Publication Data

US 2017/0290316 A1   Oct. 12, 2017

Related U.S. Application Data

(60) Provisional application No. 62/320,771, filed on Apr. 11, 2016.

(51) Int. Cl.
*A01K 97/10* (2006.01)

(52) U.S. Cl.
CPC .................... *A01K 97/10* (2013.01)

(58) Field of Classification Search
CPC ....................................... A01K 97/10
USPC ........................................ 43/21.2
See application file for complete search history.

(56) References Cited

U.S. PATENT DOCUMENTS

| | | | | |
|---|---|---|---|---|
| 4,086,716 A | * | 5/1978 | Donahue | A01K 97/10 248/533 |
| 5,025,584 A | * | 6/1991 | Butterwick, Sr. | A01K 97/10 248/528 |
| 5,400,996 A | * | 3/1995 | Drish | A01K 97/10 248/171 |
| 5,560,137 A | * | 10/1996 | Herring | A01K 97/10 248/514 |
| 6,088,946 A | * | 7/2000 | Simmons | A01K 97/11 248/535 |
| 6,216,998 B1 | * | 4/2001 | Butrymowicz | A01K 97/10 248/530 |
| 6,497,067 B1 | * | 12/2002 | King | A01K 97/10 248/538 |
| 8,397,424 B2 | * | 3/2013 | Santiago | A01K 97/10 43/21.2 |

* cited by examiner

*Primary Examiner* — Darren W Ark
*Assistant Examiner* — Steven J Shur
(74) *Attorney, Agent, or Firm* — Mark Young, PA (57) ABSTRACT

A portable, stowable, fishing rod holder includes a tripod with a pole rest at the top. An elongated support extends from the bottom of an aft leg of the tripod to a support foot. A tube, pivotally coupled to the support foot, receives the handle of a rod while the bent of the rod is held in the pole rest. A deck lock with a rotatable spring biased T-shaped anchor extends downwardly from the support foot. An anchor pin may be inserted through an aperture in the support foot.

8 Claims, 9 Drawing Sheets

FISHING ROD HOLDER

RELATED APPLICATION

This application is a nonprovisional of and claims the benefit of priority of U.S. Provisional Application 62/320,771, filed Apr. 11, 2016, the entire contents of which are incorporated herein by this reference and made a part hereof.

FIELD OF THE INVENTION

This invention relates generally to fishing rod holders, and, more particularly, to a collapsible stowable rod holder with a deck lock, anchor and tripod.

BACKGROUND

Fishing from a dock or shore is an incredibly popular pastime, enjoyed by countless anglers. Typically, the angler uses a rod and reel or a cane pole. A line extends from the pole into the water. The end of the line in the water is equipped with a hook and bait.

As any experienced angler can testify, there are often many periods when the fish are not biting. Due to the unpredictable imponderables of nature, such inactivity may suddenly cease and an extremely active period may follow during which the fish are biting. Often, during the inactive periods, anglers leave their lines baited in the water, and leave their fishing rods unattended for an indefinite period of time, such as until the a bite is observed.

Often an angler will leave an unattended fishing rod simply lying on the shore or a dock or pier while the angler relaxes or tends to other matters. The rod may be propped up against a bush, a forked stick, a tackle box, a railing along a dock or pier, or flat on the ground. During this time, there is a risk of the rod being dragged into and lost in the water, if a sizable fish takes the bait.

Various rod holders have been devised, such as a tube with a sharp end embedded in sand or soil. The handle or butt of the fishing rod may be held in the tube. Such a holder is only useful on penetrable soil.

A portable, stowable, rod holder that works as well on a dock, as it does on a pier or shore is needed. The holder should support the fishing rod at an angle to properly display and tension the fishing line in such a manner that the action of the line is readily observable by the angler. Additionally, the angle should resist removal and loss of the rod by a biting fish. Furthermore, the holder should include a removable anchor for securing it to the surface, whether it is a pier, dock or shore. Moreover, the rod holder should be stowable, easy to carry and set-up, lightweight and reliable.

The invention is directed to overcoming one or more of the problems and solving one or more of the needs as set forth above.

SUMMARY OF THE INVENTION

To solve one or more of the problems set forth above, in an exemplary implementation of the invention, a fishing rod holder includes a tripod including an aft leg, a right leg and a left leg, each having a top end and a bottom end. The top end of each of the aft leg, right leg and left leg are attached to a joint. A pole rest extends from the joint. The pole rest includes a pair of upright elements with a space therebetween for receiving and supporting a blank of a fishing rod. An elongated longitudinal support extends linearly from the aft leg to a support foot. A tube is coupled to the support foot. The tube has an open end towards the pole rest and is sized and shaped to receive a handle of a fishing rod while the pole rest supports the blank of the fishing rod.

Each of the right leg and the left leg are pivotally coupled to the joint. Each of the right leg and the left leg are pivotable between a deployed position and a closed position. In the closed position the bottom end of the right leg is adjacent to the bottom end of the left leg. In the deployed position the bottom end of the right leg is farthest from the bottom end of the left leg.

The elongated longitudinal support is coupled to the aft leg with an L-shaped coupling having an upright portion and a rearward extending portion. The aft leg includes a bottom end attached to the upright portion and the elongated shaft being attached to the rearward extending portion. The elongated longitudinal support is attached to the L-shaped coupling with a pivot pin, the elongated longitudinal support being pivotable relative to the L-shaped coupling.

The tube is coupled to the support foot with a pivot pin. The tube is pivotable from a collapsed orientation substantially horizontal, to an angled orientation aimed towards the pole rest.

A deck lock is coupled to the support foot. The deck lock includes a handle, an elongated shaft having a top end and a bottom end, and a horizontal support extending from the bottom end of the elongated shaft and being substantially perpendicular to the elongated shaft, and a spring biasing the horizontal support towards the support foot. The support foot includes a channel through which the elongated shaft of the deck lock extends. The deck lock rotates and, when pressed and released, reciprocates relative to the support foot. The support foot includes a bottom cavity. The deck lock is pivotable relative to the support foot between a stowed position and a deployed position. The horizontal support occupies the bottom cavity when the deck lock is in the stowed position. The horizontal support is external to (outside of) the bottom cavity when the deck lock is in the deployed position.

An anchor pin is provided for anchoring into penetrable terrain, such as dirt, sand, soil and the like. The anchor pin includes an elongated shank. The support foot includes an anchor pin aperture through which the anchor pin shank extends. The shank of the anchor pin includes a top end and a bottom end. The anchor pin includes a handle at the top end of the shank. The joint includes a storage aperture for receiving the shank of the anchor pin during storage.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
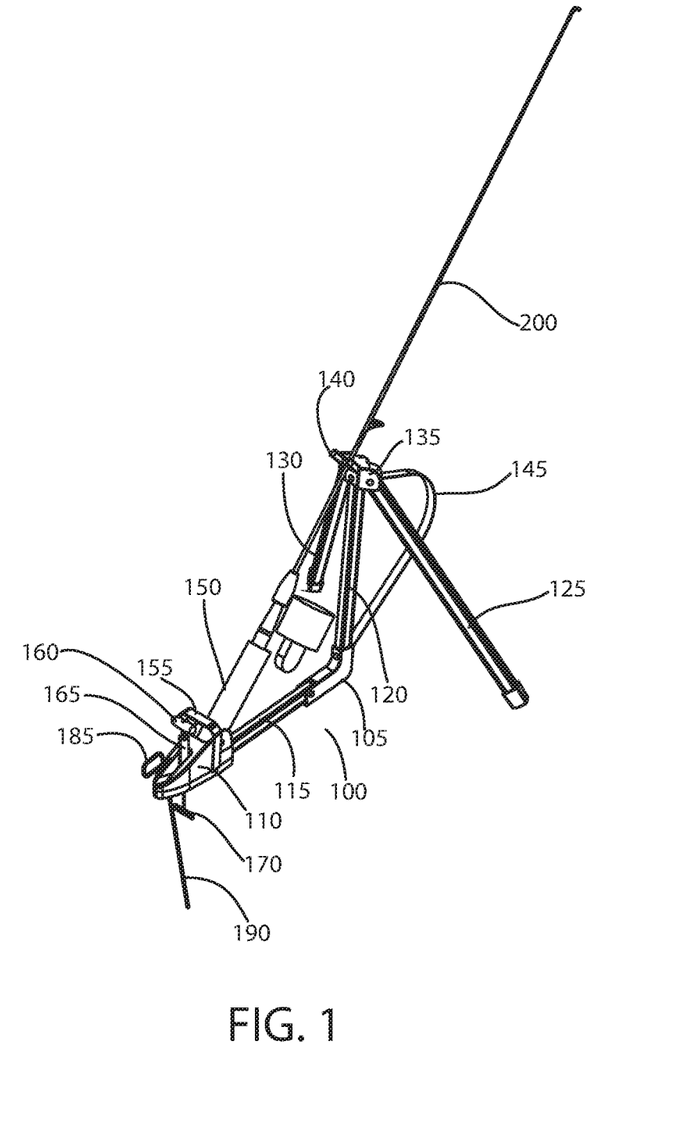
FIG. 1 provides a perspective view that conceptually illustrates a rod holder assembly in a deployed configuration supporting a fishing rod according to principles of the invention.

FIG. 1 conceptually illustrates a rod holder assembly 100 according to principles of the invention. In general, the exemplary assembly 100 is comprised of a tripod with a tube, rod or bar (support 115) extending horizontally from the bottom of the middle aft leg 120 of the tripod, a tubular rod holder (pole tube 150) supported at an angle at the distal end of the support and a U- or V-shaped pole rest 140 at the top of the tripod. The handle of the rod 200 slides into the pole tube 150 while the blank of the rod rests on the pole rest 140. The tripod is comprised of three legs, including aft leg 120, right leg 125 and left leg 130. At least two of the three legs (e.g., the right and left legs 125, 130) are pivotally joined at their top ends to a leg joint 135. The leg joint 135 allows pivoting motion about a single axis of the pivotally joined legs 125, 130. The range of pivoting motion is from a closed (stowed) position as in FIG. 9 to a deployed position as in FIG. 1. The range of motion constitutes an acute angle. The leg joint 135 includes structural elements that impede further pivoting motion. The pole rest 140 may be attached to the top of the leg joint 135 or integrally formed on the leg joint 135.

The tripod is a portable three-legged frame, used as a platform for supporting a rod and maintaining stability against downward forces, horizontal forces, and forces comprised of downward and horizontal force vector components. When deployed, the three legs are positioned away from a vertical center axis. With further reference to FIG. 1, in the exemplary embodiment, an L-shaped connector 105 (coupling) couples the support 115 to the bottom of the middle aft leg 120 of the tripod. The L-Shaped connector 105 may comprise a bent channel or tubular member with a vertical segment having a open end and a horizontal segment having an open end. In the exemplary embodiment, the open end of the horizontal segment is a channel. A pivot pin couples the longitudinal support 115 to the L-shaped connector 105, allowing pivoting rotation about the longitudinal axis of the pivot pin. The range of pivoting motion is from a closed (stowed) position as in FIG. 9 to a deployed position as in FIG. 1. The range of motion constitutes a right or slightly obtuse angle.

In the exemplary embodiment, the pole tube 150 includes an open upper and a bottom end. The bottom end is connected to an end block 110 by a pivot pin, allowing pivoting rotation about the longitudinal axis of the pivot pin. The range of pivoting motion is from a closed (stowed) position as in FIG. 9 to a deployed position as in FIG. 1. In the deployed position, the tube 150 is angled to allow the blank of the rod 200 to rest upon the pole rest 140. Further pivoting motion of the tube 150 may or may not be impeded by the structure of the end block 110.

In the exemplary embodiment, the end block 110 (i.e., a rear support foot) attaches to the distal end of the support 115. The end block 110 is a generally wedge-shaped structure with various compartments, slots, and channels for mating with components. One such compartment formed at the leading edge of the end block 110, the edge that attaches to the support 115, receives the pivoting end of the pole tube 150. The position of the pivot pin and the shape of the compartment may allow a limited range of motion of the tube 150 from the stowed to the deployed position.

A deck lock pivotally connects to another compartment of the end block 110. The deck lock includes a deck lock knob 160 (i.e., handle), a pivoting deck lock tube 165, a deck lock tube pivot mount 168 (FIG. 7), a T-shaped deck lock 170, a deck lock spring 175 and a deck lock retaining washer 180. The T-shaped deck lock 170 includes a vertical upright and a horizontal deck support. The deck lock tube 165 contains the spring 175, washer 180, and a portion of the vertical upright of the T-shaped deck lock 170. The deck lock knob 160 is connected to the vertical upright of the T-shaped deck lock 170. The horizontal deck support of the T-shaped deck lock 170 may be urged away from the bottom of the end block 110 by pressing down on the knob 160. The spring 175 urges the horizontal deck support of the T-shaped deck lock 170 towards the bottom of the end block 110 by pressing against the washer 180 fixed to the vertical upright of the T-shaped deck lock 170. The T-shaped deck lock 170 is rotatable about an axis aligned with the vertical upright of the T-shaped deck lock 170. Thus, the horizontal deck support of the T-shaped deck lock 170 may be oriented to fit between a space between board (slats) comprising a deck of a dock or pier, urged away from the bottom of the end block 110 to clear the thickness of the slats, rotated about 90 degrees, and released to allow the spring 175 to urge the horizontal deck support of the T-shaped deck lock 170 against the underside of the slats. In such manner, the deck lock secures the rod holder to a pier or dock.

Figure 9:
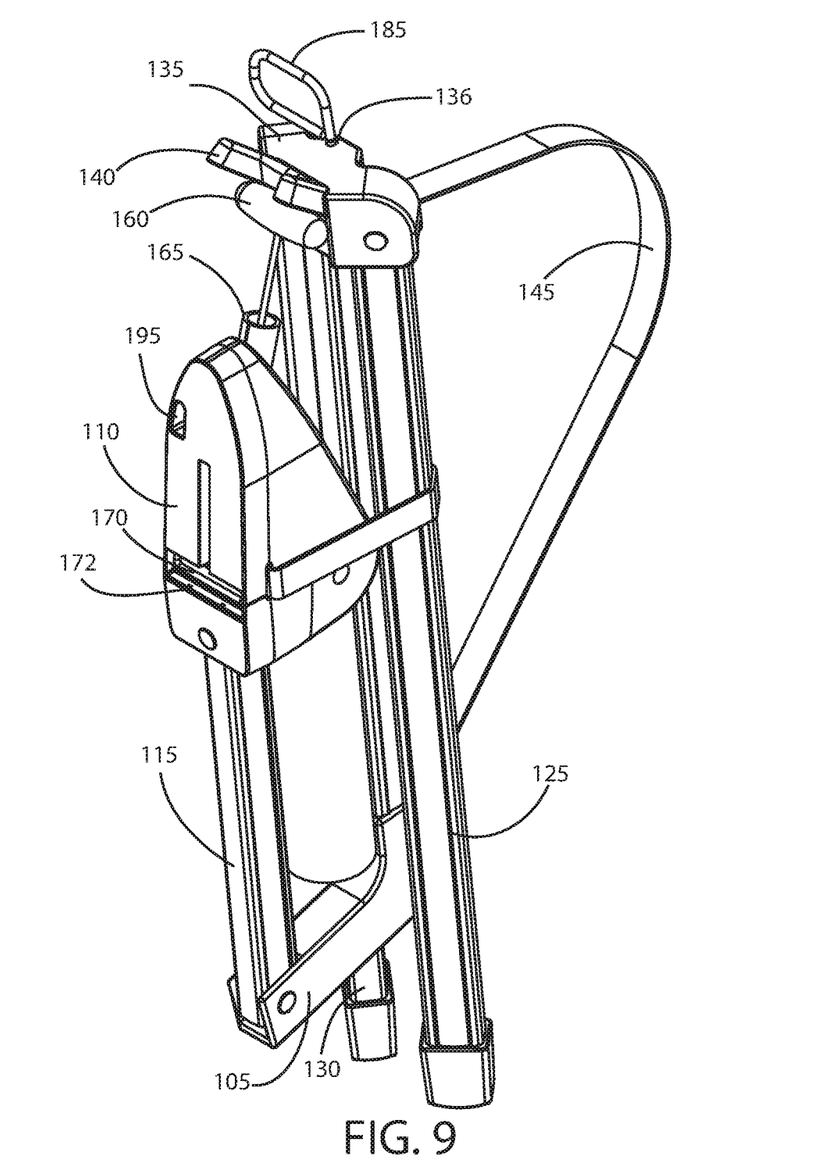
FIG. 9 provides a perspective view that conceptually illustrates the rod holder assembly in a closed (stowed) configuration according to principles of the invention.

A lock strap 155 is a flexible strap extends through a channel in the bottom of the end block 110. The lock strap may be opened and closed. In an exemplary embodiment, the lock strap 155 includes hook and loop fastening elements to allow opening (release) and closing (fastening). The strap 155 has sufficient length to bind stowed elements. As shown in FIG. 9, the stowed elements bound by the strap include the tripod legs 120, 125, 130. When the rod holder assembly 100 is in use, strap 155 may be removed or left in place. As alternatives to a strap with hook and loop fastening elements, a flexible strap with a buckle or snaps, or a flexible ratchet strap, or a flexible strap with a cam lock, or a flexible string or cord capable of being tied, or a flexible cord with a cord lock, may be used.

The deck lock tube pivot mount 168 is pivotally retained within the compartment of the end block 110 to allow pivoting rotation of the deck lock from a deployed position as shown in FIG. 1 to a stowed position as shown in FIG. 9. A T-shaped cutout 172 in the bottom of the end block 110 receives the T-shaped deck lock 170 when the deck lock is pivoted to a closed (stowed) position. Concomitantly, the deck lock tube 165 is oriented and contained substantially within the compartment of the end block 100 when the deck lock is pivoted to a closed (stowed position, as in FIG. 9). The deck lock is pivoted about 90 degrees from the stowed position to the open (deployed) position. In the open deployed position, the rod and vertical upright of the T-shaped deck lock 170 extend substantially vertical, while the horizontal deck support of the T-shaped deck lock 170 is substantially horizontal.

An anchor pin 190 with a handle 185 and an elongated shaft (i.e., shank) may be inserted into a slot 195 (FIG. 9) of the end block 110. The pin 190 may extended (vertically or askew but with a substantial vertical component) through the slot 195 down into the terrain (e.g., sand or soil) of a shore to anchor the assembly in place. The anchor pin is removable from the slot 195. When the assembly is used on a dock or pier, the anchor pin is not used. When the assembly is used on a shore with penetrable terrain such as sand, soil or clay, the anchor pin is used. Thus, either the deck lock or anchor pin is used, during normal use of the assembly.

The leg joint 135 may include a narrow channel 136 (FIG. 9) for receiving the anchor pin 190 when the assembly is stowed. When inserted into the channel 136, the handle 185 rests against the joint 135, and the elongated shaft of the anchor pin 190 extends alongside or between the stowed legs 120, 125, 130 of the tripod. Thus, the anchor pin 190 is another component bound by the strap 155 in the stowed configuration.

A carrying strap (e.g., shoulder strap 145) is connected at one end to the top end of the aft leg 120 or to the joint 135 and at the opposite end to the bottom end of the aft leg 120 or to the L-shaped connector 105. The strap may be removable or permanently attached. In the case of a removable strap, removable attachments such as side release buckles may be used.

Figure 2:
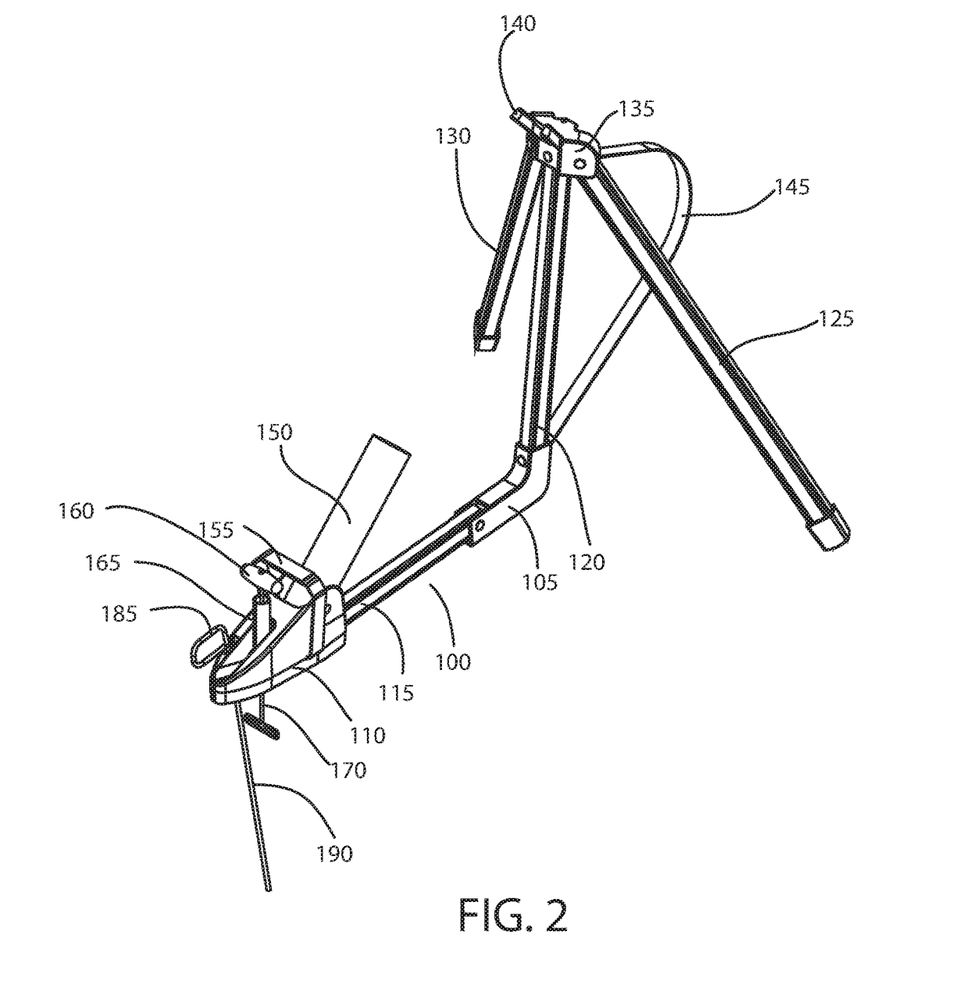
FIG. 2 provides a perspective view that conceptually illustrates the rod holder assembly in a deployed configuration without the fishing rod according to principles of the invention.

FIG. 2 conceptually illustrates the rod holder assembly 100 in the deployed configuration without the fishing rod 200 according to principles of the invention. Without the rod 200, the tube 150 is free to pivot downwardly until it comes to rest against the longitudinal support 115.

Figure 3:
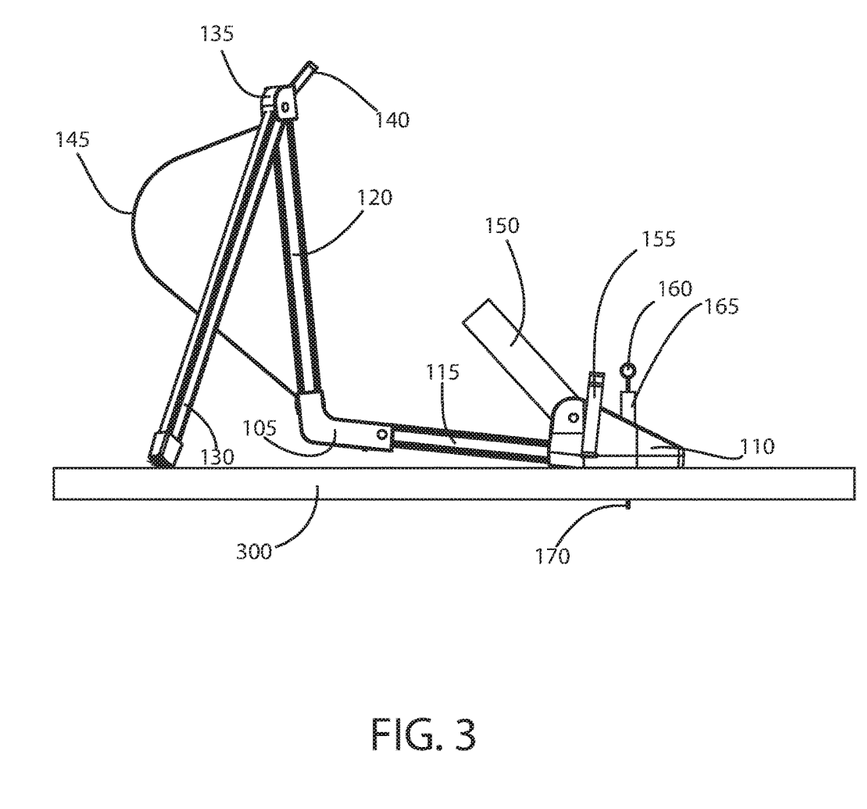
FIG. 3 provides a side view that conceptually illustrates the rod holder assembly in the deployed configuration, anchored to a deck 300, without the fishing rod 200, according to principles of the invention.
Figure 4:
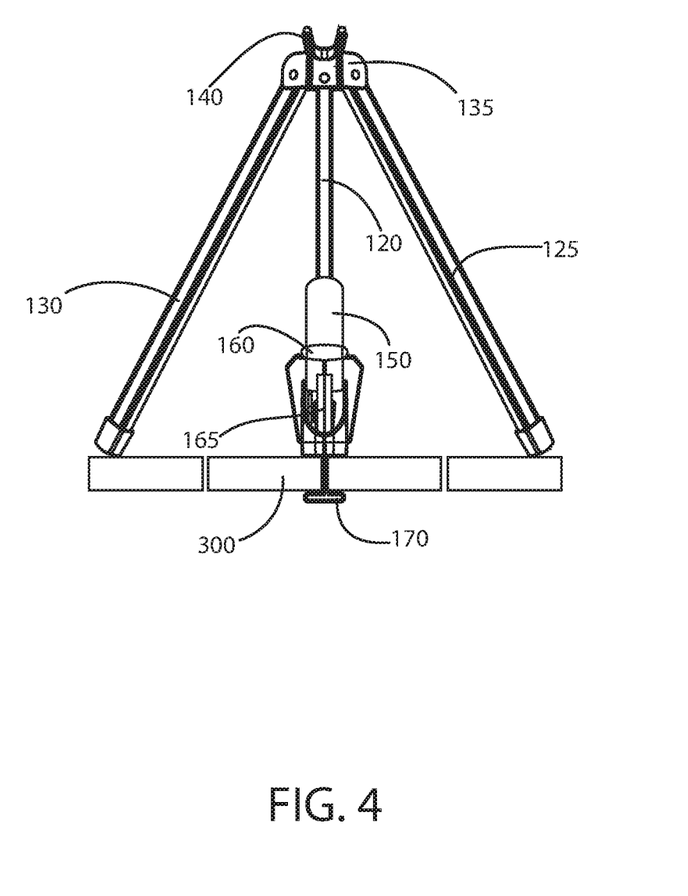
FIG. 4 provides a back view that conceptually illustrates the rod holder assembly in the deployed configuration, anchored to a deck 300, without the fishing rod 200, according to principles of the invention.
Figure 5:
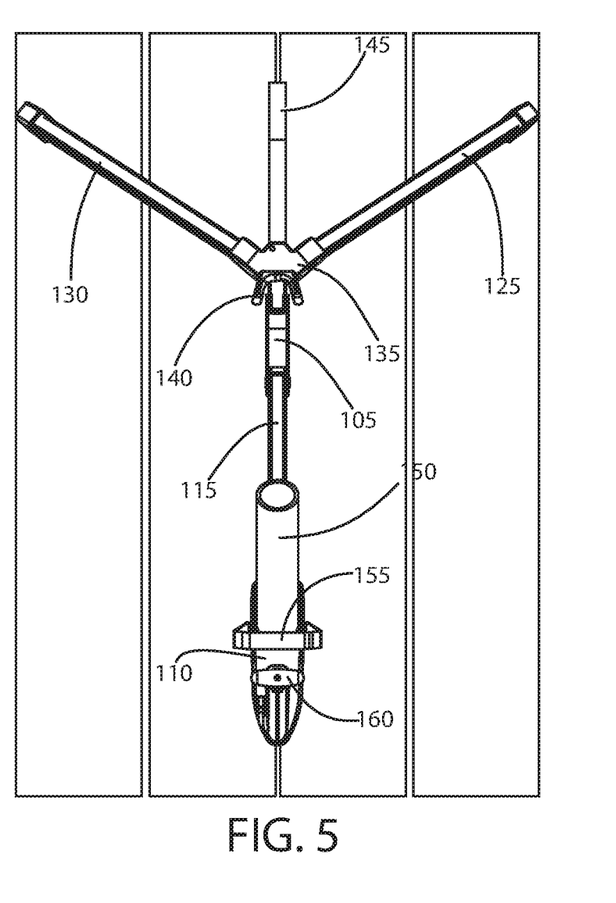
FIG. 5 provides a plan view that conceptually illustrates the rod holder assembly in the deployed configuration, anchored to a deck 300, without the fishing rod 200, according to principles of the invention.

FIGS. 3 through 5 conceptually illustrate the rod holder assembly 100 in the deployed configuration, anchored to a deck 300, without the fishing rod 200, according to principles of the invention. The deck 300 is comprised of spaced apart, generally parallel, elongated planks that are nailed or screwed onto spaced apart parallel joists. The deck 300 may comprise the surface of a dock or pier. The vertical portion of the T-shaped deck lock 170 extends between the space separating a pair of adjacent planks, with the horizontal portion flush against the underside of the planks orthogonal to the elongated axis of the planks. The deck lock spring 175 urges the horizontal portion of the T-shaped deck lock 170 flush against the underside of the planks. Evident from FIG. 3, in the exemplary embodiment, the longitudinal support 115 extends from the L-Shaped connector 105 to the wedge-shaped end block 110 at an acute angle relative to the horizontal, when the assembly 100 is positioned on a generally planar level surface. Also evident, from FIGS. 3 through 5, the anchor pin 190 may be removed when the assembly 100 is deployed on a deck or other non-penetrable surface. For convenience, the anchor pin 190 may be stored, when not in use, by sliding the elongated pin into the narrow channel 136 of the leg joint 135. The handle 185 of the anchor pin 190 may be pivoted out of the way of a rod blank supported in the U- or V-shaped pole rest 140.

Figure 6:
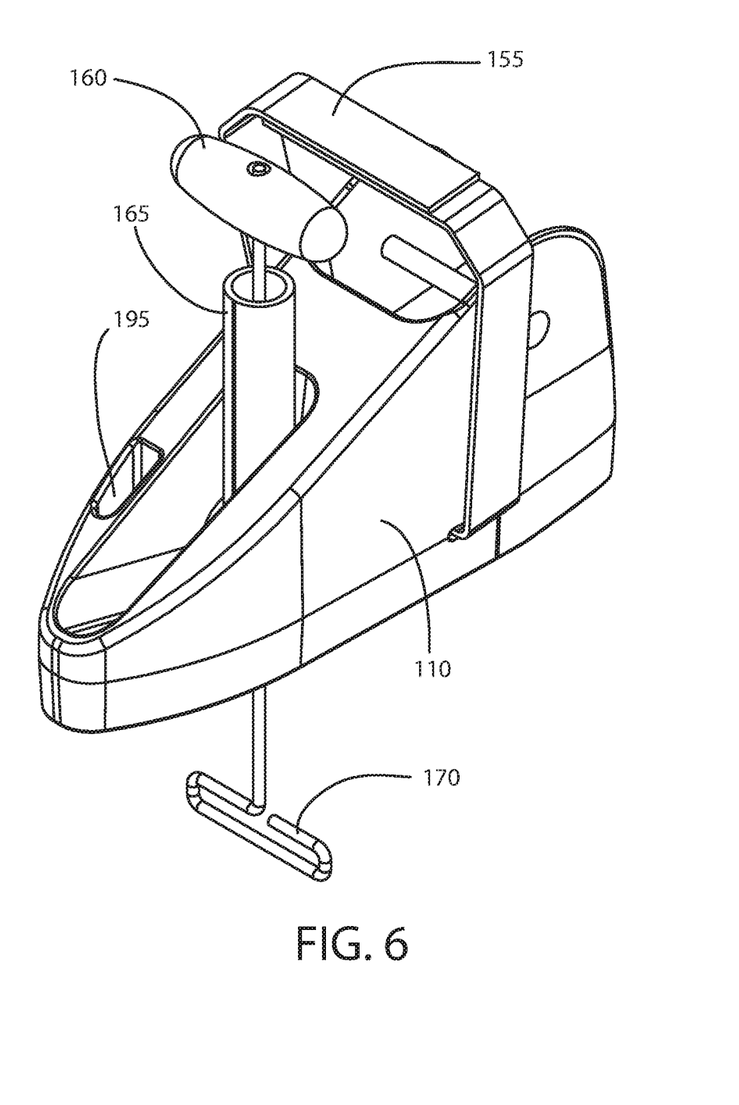
FIG. 6 provides a close-up perspective view of an exemplary end block for a fishing rod holder assembly according to principles of the invention.

FIG. 6 provides a close-up perspective view of an exemplary end block 110 for a fishing rod holder assembly according to principles of the invention. The end block 110 provides a structure to which several components connect, including the distal end of the longitudinal support 115, strap 155, deck lock 170 and anchor pin 190. Additionally, the bottom of the end block 110 sits on the ground, acting as a ground-contacting support foot for the aft leg 120.

Figure 7:
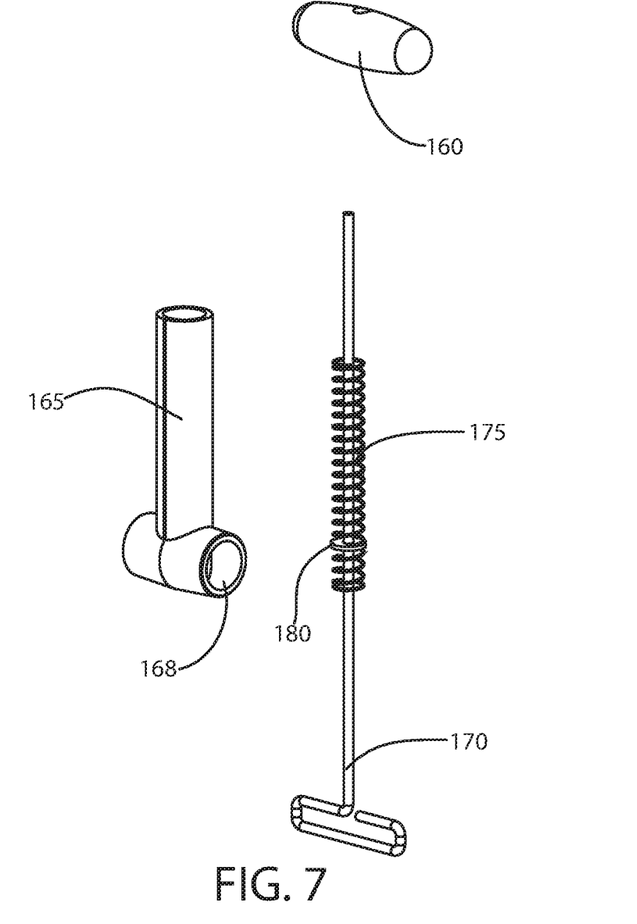
FIG. 7 provides an exploded perspective view of a deck lock assembly for a fishing rod holder assembly according to principles of the invention.

FIG. 7 provides an exploded perspective view of a deck lock assembly for a fishing rod holder assembly according to principles of the invention. The deck lock includes a deck lock knob 160, a pivoting deck lock tube 165, a deck lock tube pivot mount 168 a generally T-shaped deck lock 170, a deck lock spring 175 and a deck lock retaining washer 180. The T-shaped deck lock 170 includes a vertical upright and a horizontal deck support. The pivot mount 168 sits in a cradle within the end block 110. The cradle allows pivoting rotation about an axis extending axially through the pivot mount 168. Alternatively, the pivot mount 168 may rotate about a pin within the end block 110. The deck lock tube 165 contains the spring 175, washer 180, and a portion of the vertical upright of the T-shaped deck lock 170. The deck lock knob 160 is connected to the vertical upright of the T-shaped deck lock 170. Pivoting rotation of the deck lock 170 about the pivot mount 168 allows the deck lock to be pivoted between a stowed position and a deployed position. In the stowed position, the T-shaped deck lock 170 fits into a T-shape cutout 172 in the bottom of the end block 110. The stowed position is appropriate for carrying the assembly 100 and for use of the assembly on a surface on which the T-shaped deck lock 170 is not used. In the deployed position, the T-shaped deck lock 170 extends substantially normal to the bottom surface of the end block 110.

Figure 8:
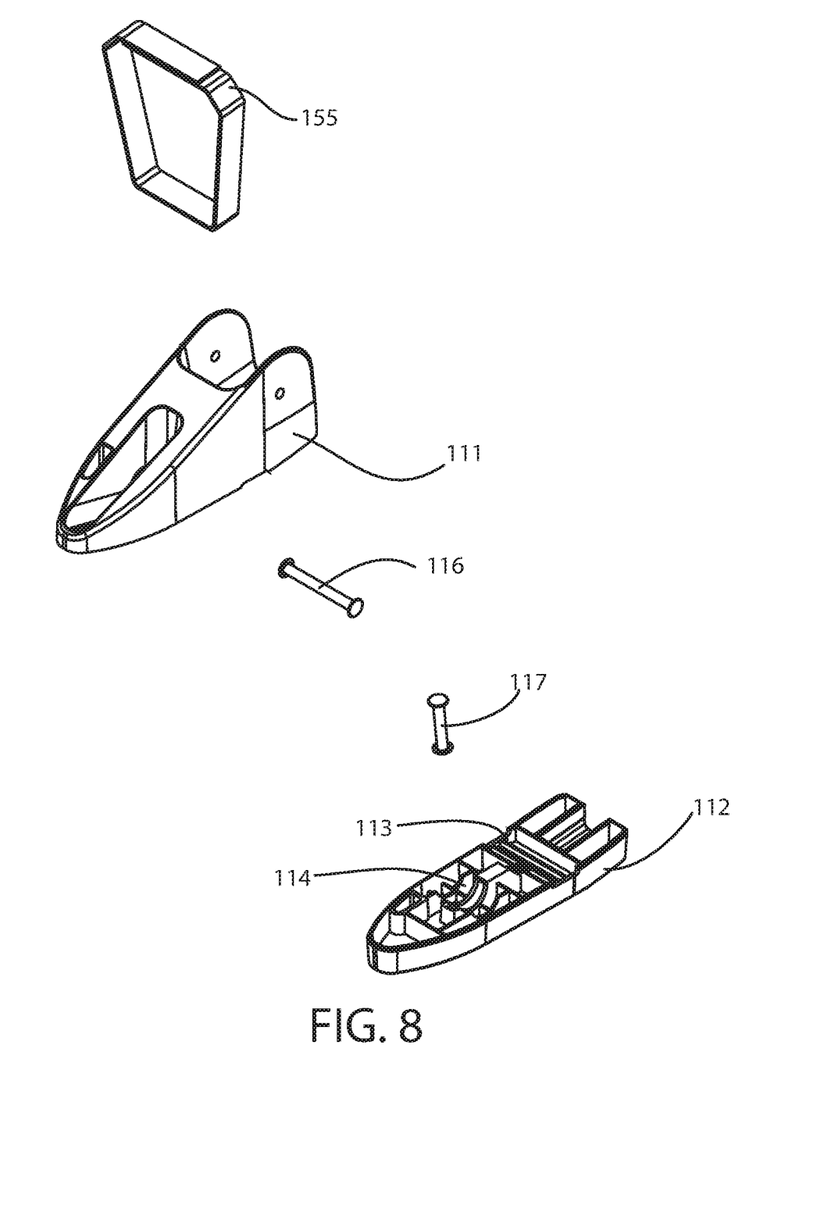
FIG. 8 provides an exploded perspective view of an exemplary end block for a fishing rod holder assembly according to principles of the invention.

FIG. 8 provides an exploded view of the end block 110. A bottom cover 112 includes a cradle 114, i.e., a semi-circular cross section cavity, sized and shaped to receive the deck lock tube pivot mount 168, allowing the deck lock tube pivot mount 168 to pivot in the cradle 114. The bottom cover also includes a channel 113 sized and shaped to receive the strap 155. A fastener (e.g., a rivet) 117 secures the bottom cover 112 to the top body 111. A pivot pin 116 extends across the channel of the top body 111 in which the distal end of the longitudinal support 115 is received.

The rod holder assembly 100 may be produced using any suitable manufacturing techniques known in the art for the chosen material, such as (for example) extrusion, injection, compression, structural foam, or rotary molding, casting and milling. Preferably the manufacturing technique is suitable for mass production at relatively low cost per unit, and results in an aesthetically acceptable product with a consistent acceptable quality and structural characteristics.

An assembly 100 according to principles of the invention may be comprised of metals, alloys, composites and/or any of various plastics. While many other materials may be used alone or in combination with the aforementioned materials and/or other materials, without departing from the scope of the present invention, preferably the material is relatively inexpensive, easy to use in manufacturing operations and results in an aesthetically acceptable, durable, high compression and tensile strength product. The material may further include additives to provide desired properties such as structurally reinforcing additives (e.g., glass or carbon fibers), desired colors, structural characteristics, glow-in-the dark properties and thermal reactivity (e.g., color changes according to heat).

By way of example and not limitation, the assembly 100 may optionally be formulated to change color when it reaches a predetermined or higher temperature. This can be accomplished by mixing a thermochromic additive (e.g., thermochromic pigment) to the base material in an amount that is sufficient to achieve a desired color changing range. As an example, a mixture of approximately 5% to 30% (pbw) of Matsui International Co., Inc.'s Chromicolor concentrate may be introduced to the base material, to provide a plastic structure that visibly changes color at a determined elevated temperature, such as approximately 90 degrees Fahrenheit or higher.

Alternatively, a photochromic additive may be added to the base material in an amount that is effective to achieve a desired color change when the assembly 100 is exposed to certain lighting conditions. As an example, a mixture of approximately 5% to 35% (pbw) of Matsui International Co., Inc.'s Photopia additive may be introduced to the base material, to provide a plastic structure that visibly changes color in the presence of sunlight or ultraviolet light.

As another alternative, phosphorescent polymer additives, such as aluminate based phosphors, may be added to adsorb light energy and continue to release that energy as visible light after the energy source is removed. Advantageously, such an embodiment provides an assembly 100 that is easy to locate in darkened conditions, making the device easy to spot even at nighttime.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A fishing rod holder comprising
a tripod including an aft leg, a right leg and a left leg, each having a top end and a bottom end, the top end of each of the aft leg, right leg and left leg attached to a joint,
a pole rest extending from the joint, the pole rest comprising a pair of upright elements with a space therebetween for receiving and supporting a blank of a fishing rod,
an elongated longitudinal support extending linearly from the aft leg to a support foot, the support foot including a top and a bottom, the bottom of the support foot resting upon a surface when the fishing rod holder is in use, and the support foot including a channel extending from the top to the bottom and a cavity in the bottom of the support foot,
a deck lock coupled to the support foot, the deck lock comprising a handle, an elongated shaft having a top end and a bottom end, and a horizontal support extending from the bottom end of the elongated shaft and being substantially perpendicular to the elongated shaft, a spring biasing the horizontal support towards the support foot, and the elongated shaft of the deck lock extending through the channel of the support foot, and the deck lock being rotatable relative to the support foot and capable of reciprocating movement relative to the support foot, and the deck lock being pivotable relative to the support foot between a stowed position and a deployed position, and the deck lock occupying the bottom cavity when the deck lock is in the stowed position and the deck lock being outside of the bottom cavity when the deck lock is in the deployed position,
an L-shaped coupling having an upright portion and a rearward extending portion, the elongated longitudinal support being coupled to the aft leg with the L-shaped coupling, the bottom end of the aft leg being attached to the upright portion and a pivot pin attaching the elongated longitudinal support to the rearward extending portion, the elongated longitudinal support being capable of pivoting rotation relative to the L-shaped coupling about the pivot pin, and
a tube coupled to the support foot, said tube having an open end towards the pole rest, said tube being sized and shaped to receive a handle of the fishing rod while the pole rest supports the blank of the fishing rod.

2. The fishing rod holder of claim 1, the top end of each of the right leg and the left leg being pivotally coupled to the joint, and each of the right leg and the left leg being pivotable between a deployed position and a closed position, and in the closed position the bottom end of the right leg being adjacent to the bottom end of the left leg, and in the deployed position the bottom end of the right leg being farthest from the bottom end of the left leg.

3. The fishing rod holder of claim 1, the elongated longitudinal support attached to the L-shaped coupling with a pivot pin, the elongated longitudinal support being pivotable relative to the L-shaped coupling.

4. The fishing rod holder of claim 1, the tube being coupled to the support foot with a pivot pin, the tube being pivotable from a collapsed orientation substantially horizontal, to an angled orientation aimed towards the pole rest.

5. The fishing rod holder of claim 1, the tube being coupled to the support foot with a second pivot pin, the tube being pivotable from a collapsed orientation substantially horizontal, to an angled orientation aimed towards the pole rest.

6. The fishing rod holder of claim 1, further comprising an anchor pin, the anchor pin including an elongated shank, the support foot including an anchor pin aperture through which the anchor pin shank extends.

7. The fishing rod holder of claim 6, the shank of the anchor pin including a top end and a bottom end, and the anchor pin including a handle at the top end of the shank.

8. The fishing rod holder of claim 6, the joint including a storage aperture for receiving the shank of the anchor pin during storage.

* * * * *